(12) United States Patent
Kwak

(10) Patent No.: US 11,973,175 B2
(45) Date of Patent: Apr. 30, 2024

(54) METHOD OF MANUFACTURING POUCH-SHAPED BATTERY CELL USING FIXING JIG AND POUCH-SHAPED BATTERY CELL MANUFACTURED USING THE SAME

(71) Applicant: LG Energy Solution, Ltd., Seoul (KR)

(72) Inventor: Jin Seop Kwak, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 0 days.

(21) Appl. No.: 17/640,637

(22) PCT Filed: Oct. 29, 2020

(86) PCT No.: PCT/KR2020/095130
§ 371 (c)(1),
(2) Date: Mar. 4, 2022

(87) PCT Pub. No.: WO2021/118331
PCT Pub. Date: Jun. 17, 2021

(65) Prior Publication Data
US 2022/0407105 A1    Dec. 22, 2022

(30) Foreign Application Priority Data

Dec. 9, 2019  (KR) .................. 10-2019-0162510

(51) Int. Cl.
*H01M 10/04* (2006.01)
*H01M 4/04* (2006.01)
(Continued)

(52) U.S. Cl.
CPC ....... *H01M 10/0404* (2013.01); *H01M 4/044* (2013.01); *H01M 10/049* (2013.01); *H01M 50/105* (2021.01); *H01M 50/183* (2021.01)

(58) Field of Classification Search
CPC ......... H01M 10/0404; H01M 50/105; H01M 4/044; H01M 10/049; H01M 50/124; H01M 50/211
See application file for complete search history.

(56) References Cited

U.S. PATENT DOCUMENTS

| | | | |
|---|---|---|---|
| 2014/0011070 A1* | 1/2014 | Kim | H01M 50/124 29/623.2 |
| 2015/0024263 A1* | 1/2015 | Han | H01M 10/0436 429/185 |

(Continued)

FOREIGN PATENT DOCUMENTS

| | | |
|---|---|---|
| CN | 102709600 A | 10/2012 |
| CN | 203300708 U | 11/2013 |

(Continued)

OTHER PUBLICATIONS

International Search Report for Application No. PCT/KR2020/095130 dated Feb. 15, 2021, 2 pages.
(Continued)

*Primary Examiner* — Matthew T Martin
*Assistant Examiner* — Grace Ann Kenlaw
(74) *Attorney, Agent, or Firm* — Lerner David LLP

(57) ABSTRACT

Disclosed is a method of manufacturing a pouch-shaped battery cell, the method including (a) forming an electrode assembly receiving portion in a laminate sheet to manufacture a preliminary battery case, (b) receiving an electrode assembly in the electrode assembly receiving portion and sealing other outer peripheries of the preliminary battery case excluding a first side outer periphery of the preliminary battery case, through which gas is discharged, (c) disposing a fixing jig at each of opposite end corner portions of a first side outer periphery of the electrode assembly receiving portion, (d) performing an activation process and a degassing process, (e) resealing the first side outer periphery of the
(Continued)

electrode assembly receiving portion, and removing an end of the preliminary battery case, wherein step (d) to step (f) are performed in the state in which the corner portion is in tight contact with the inner surface of the fixing jig, which is technology capable of preventing the preliminary battery case from being deformed by force continuously applied to the preliminary battery case in a process of manufacturing the pouch-shaped battery cell.

13 Claims, 8 Drawing Sheets

(51) Int. Cl.
*H01M 50/105* (2021.01)
*H01M 50/183* (2021.01)

(56) References Cited

U.S. PATENT DOCUMENTS

| | | |
|---|---|---|
| 2016/0181667 A1 | 6/2016 | Kim et al. |
| 2020/0067034 A1 | 2/2020 | Kim et al. |
| 2020/0185675 A1 | 6/2020 | Lee et al. |
| 2022/0251432 A1* | 8/2022 | Yang .................... C08G 59/62 |
| 2023/0077553 A1 | 3/2023 | Bae et al. |

FOREIGN PATENT DOCUMENTS

| | | | |
|---|---|---|---|
| CN | 203398168 U | | 1/2014 |
| CN | 104303332 A | | 1/2015 |
| JP | 2010186786 A | | 8/2010 |
| KR | 20080019313 A | | 3/2008 |
| KR | 20130092800 A | | 8/2013 |
| KR | 20130113301 A | | 10/2013 |
| KR | 20170058047 A | * | 5/2017 |
| KR | 20170087250 A | | 7/2017 |
| KR | 20170087250 A | * | 7/2017 |
| KR | 20170132565 A | | 12/2017 |
| KR | 20170132565 A | * | 12/2017 |
| KR | 20180072934 A | | 7/2018 |
| KR | 20180118929 A | | 11/2018 |
| KR | 20190042800 A | | 4/2019 |
| KR | 20190042801 A | | 4/2019 |
| KR | 20190054810 A | | 5/2019 |
| WO | 2019078447 A1 | | 4/2019 |
| WO | 2019117558 A1 | | 6/2019 |

OTHER PUBLICATIONS

Extended European Search Report for Application No. 20898634.9 dated Oct. 14, 2022. 6 pgs.

* cited by examiner

[FIG. 1]
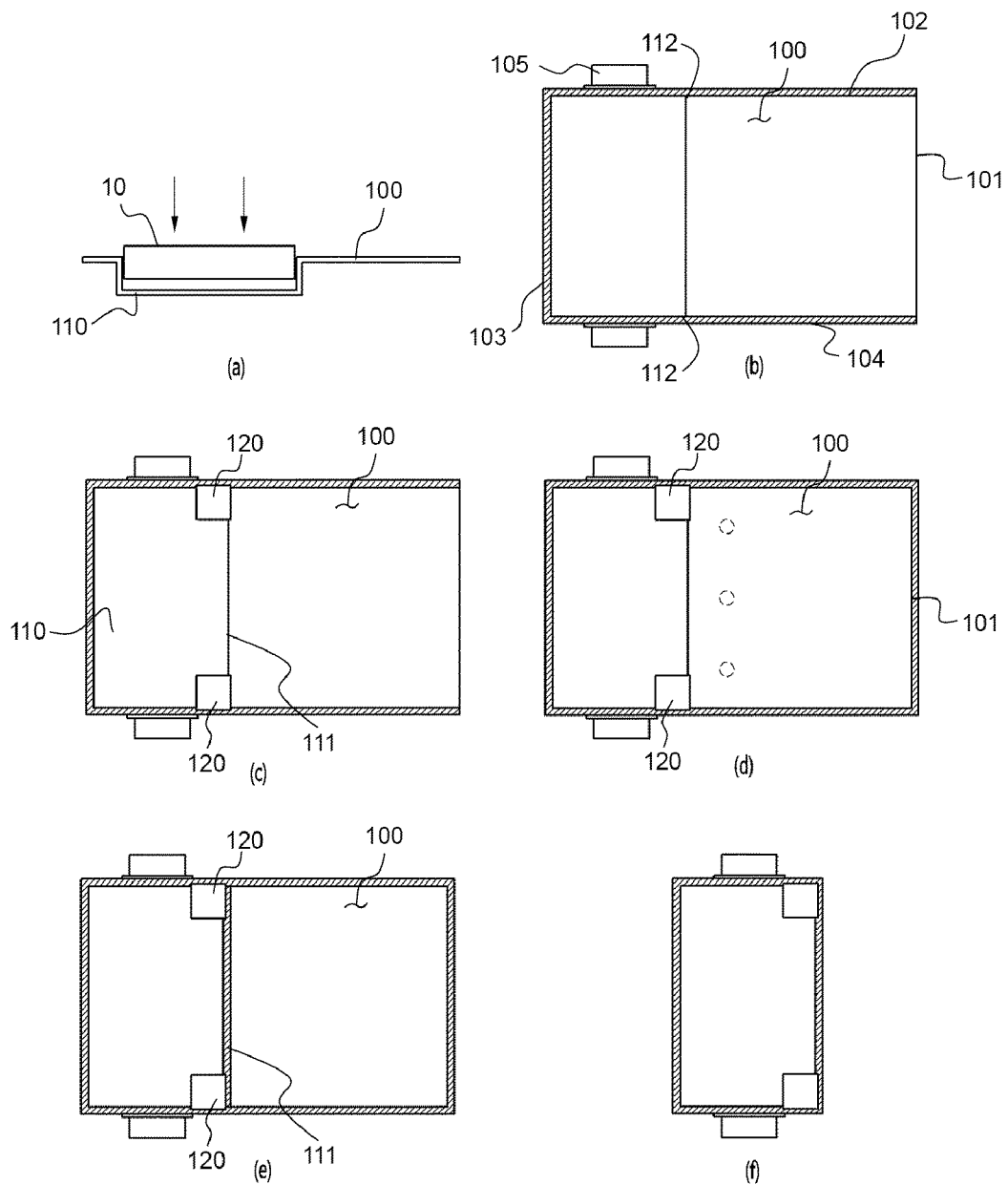

[FIG. 2]
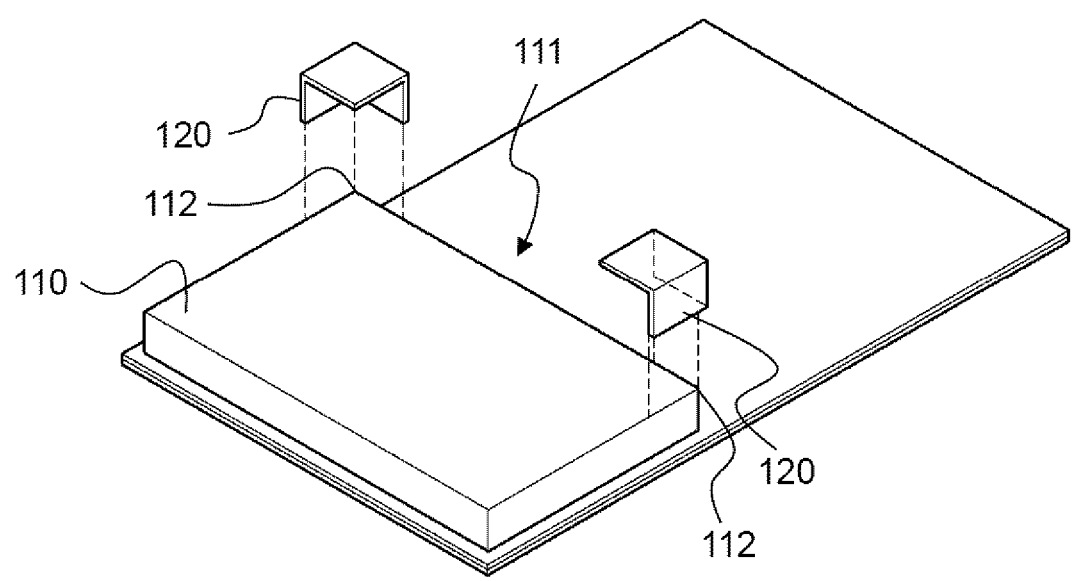

[FIG. 3]
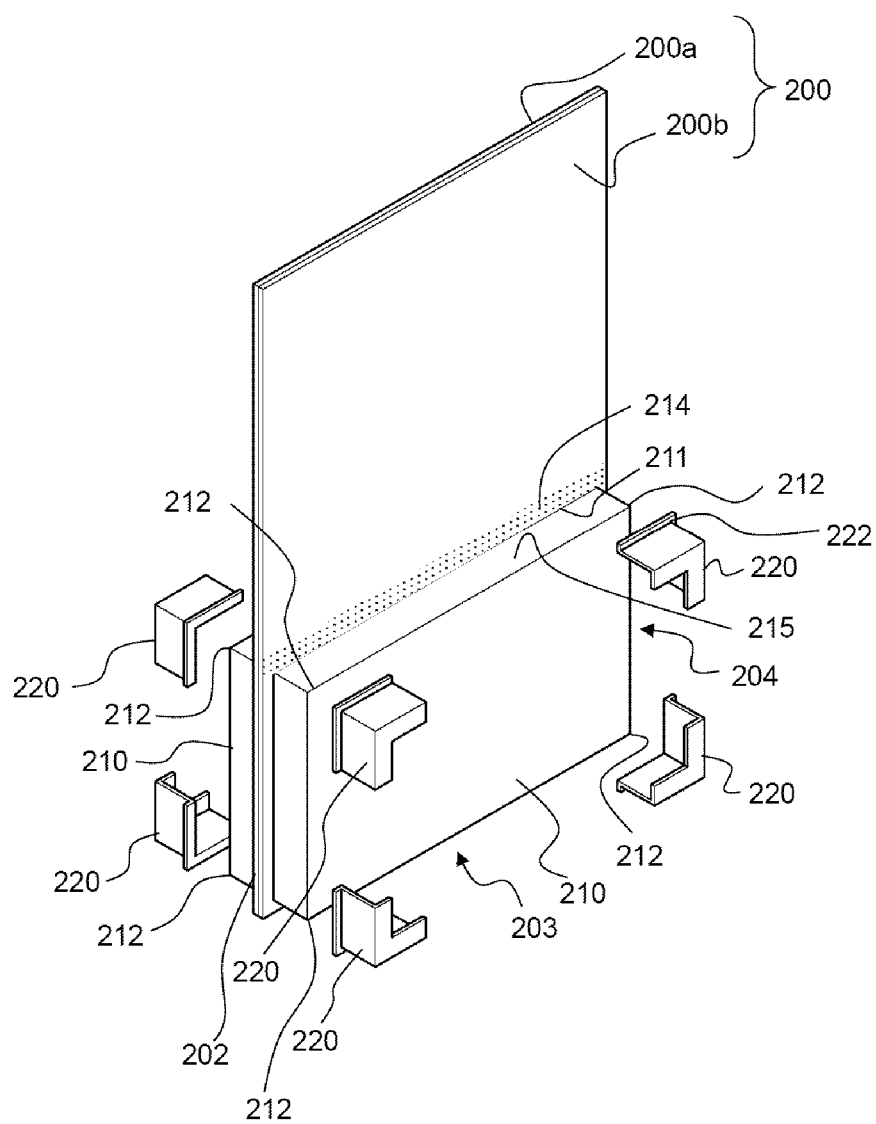

[FIG. 4]
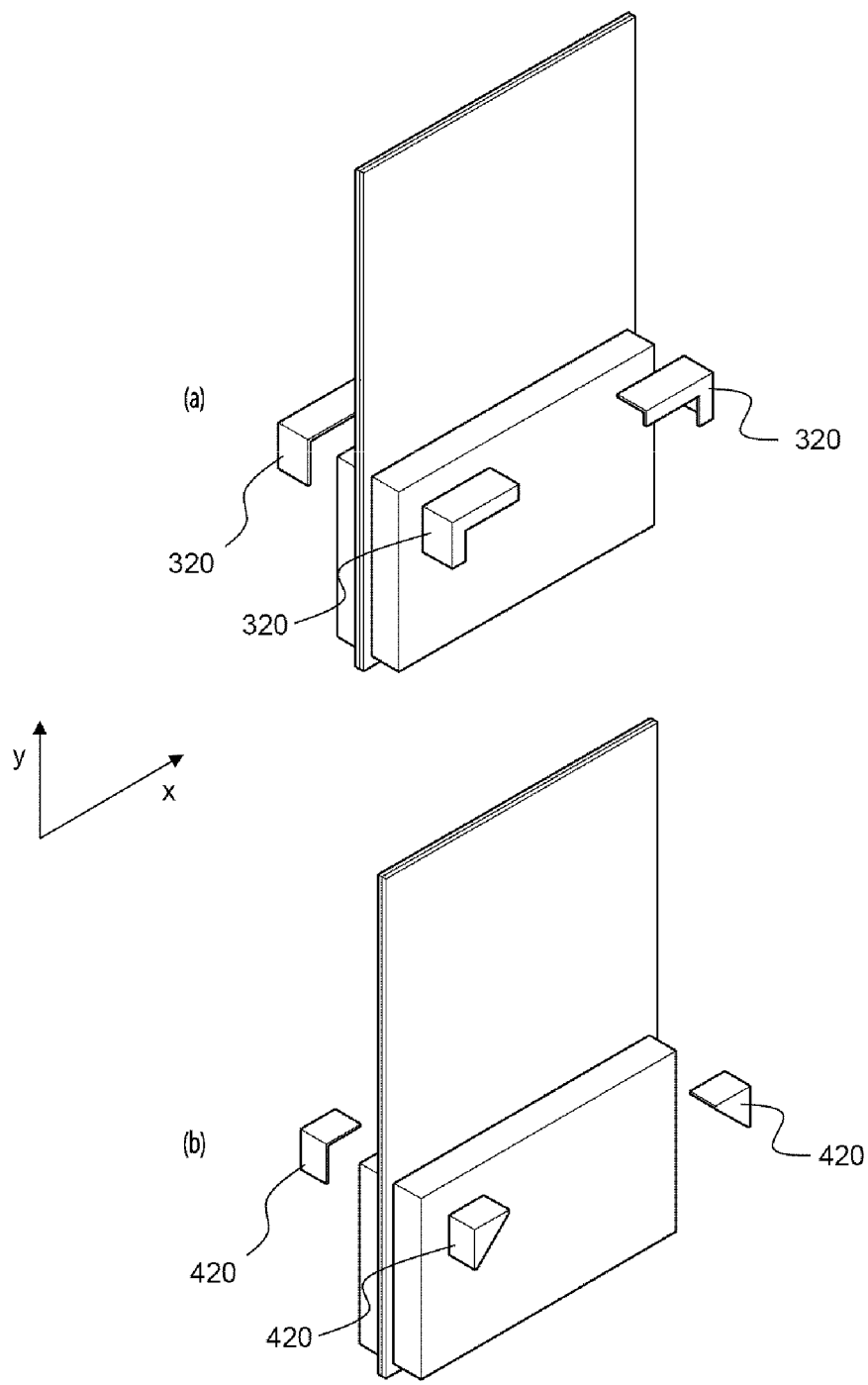

[FIG. 5]
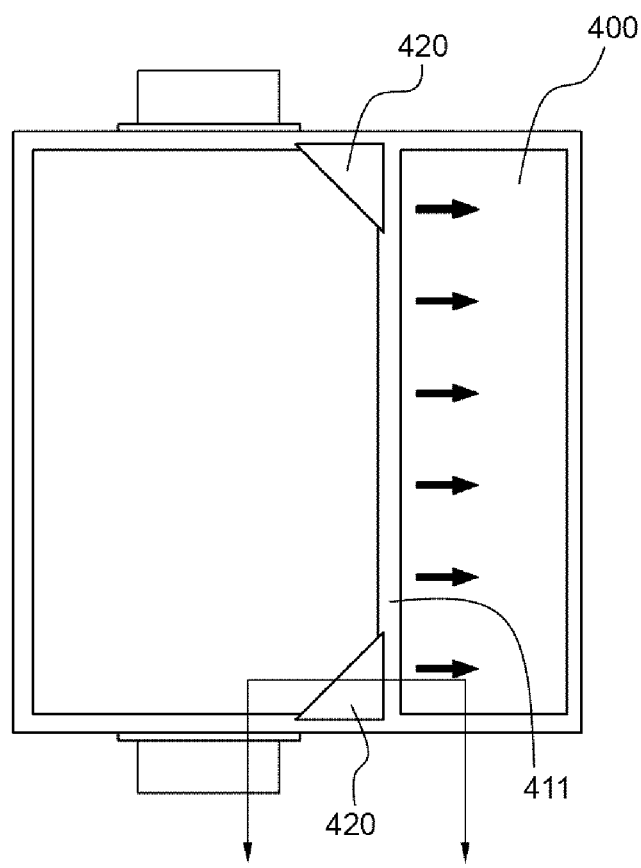

[FIG. 6]
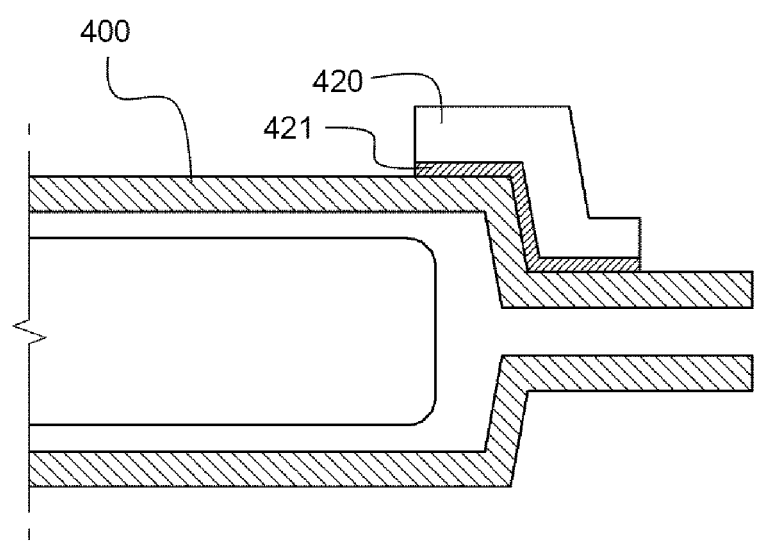

【FIG. 7】
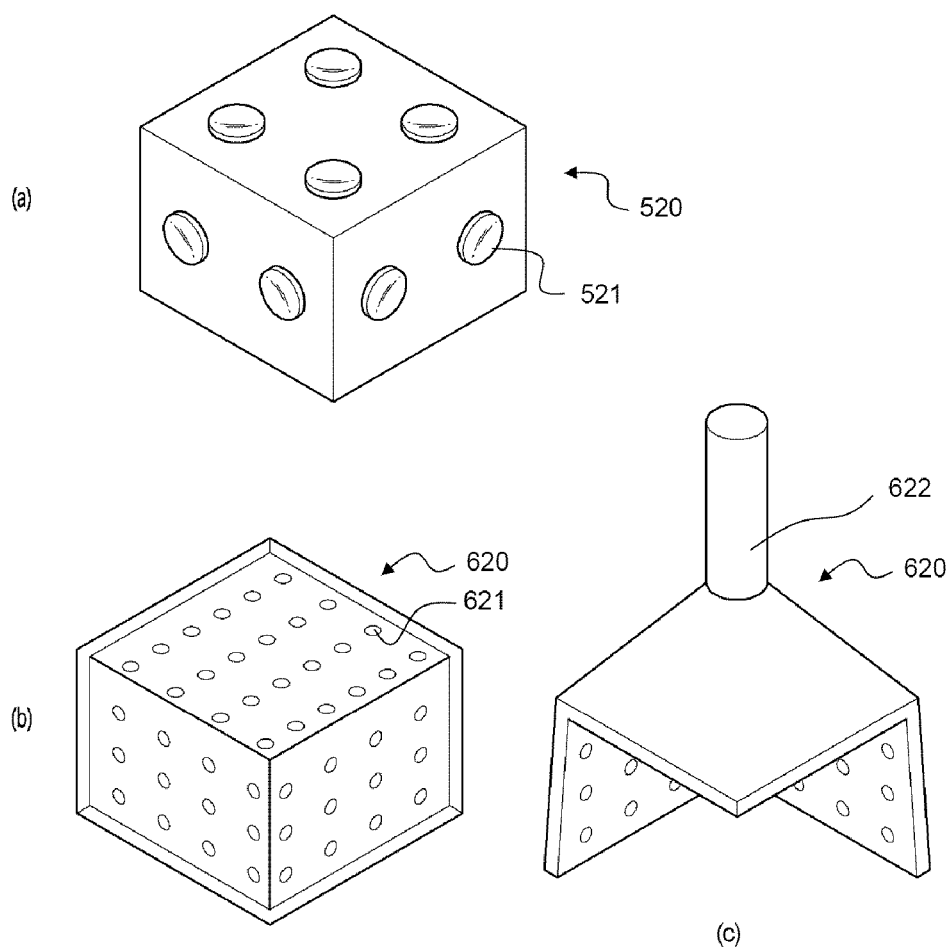

【FIG. 8】
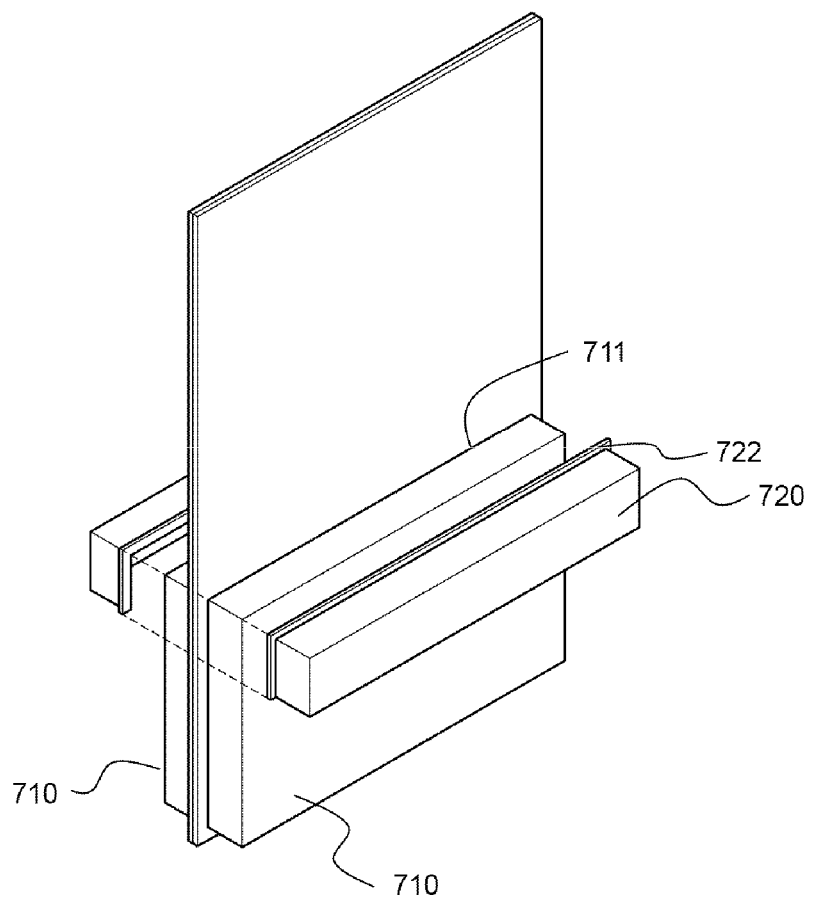

METHOD OF MANUFACTURING POUCH-SHAPED BATTERY CELL USING FIXING JIG AND POUCH-SHAPED BATTERY CELL MANUFACTURED USING THE SAME

This application is a national phase entry under 35 U.S.C. § 371 of International Application No. PCT/KR2020/095130 filed Oct. 29, 2020 and claims the benefit of priority to Korean Patent Application No. 2019-0162510 filed on Dec. 9, 2019, the disclosures of which are hereby incorporated by reference herein in their entireties.

TECHNICAL FIELD

The present invention relates to a method of manufacturing a pouch-shaped battery cell using a fixing jig and a pouch-shaped battery cell manufactured using the same. More particularly, the present invention relates to a method of manufacturing a pouch-shaped battery cell using a fixing jig capable of manufacturing the pouch-shaped battery cell in a state in which a portion of the pouch-shaped battery cell that may be most greatly deformed in a process of manufacturing the pouch-shaped battery cell is in tight contact with a fixing jig so as to be fixed by the fixing jig, whereby it is possible to remarkably reduce a battery cell defect rate, and a pouch-shaped battery cell manufactured using the same.

BACKGROUND ART

Based on the shape of a case, a lithium secondary battery is classified as a cylindrical battery, a prismatic battery, or a pouch-shaped battery. Each of the cylindrical battery and the prismatic battery is a battery having an electrode assembly mounted in a metal can, and the pouch-shaped battery is a battery having an electrode assembly mounted in a pouch-shaped case generally made of an aluminum laminate sheet. Among these batteries, the pouch-shaped battery, which can be stacked with high integration, has relatively high energy density per unit weight, is inexpensive, can be easily modified, and has attracted considerable attention in recent years.

The laminate sheet includes an outer coating layer configured to secure insulation thereof and to protect the surface thereof, a metal layer configured to block gas and moisture and to allow a battery case to be easily formed, and an inner resin layer for adhesion.

In general, a process of forming an electrode assembly receiving portion, a degassing process, and a process of sealing the outer periphery of the battery case are performed in order to manufacture the pouch-shaped battery. While the above processes are performed, the metal layer of the laminate sheet may be damaged. In particular, stress is concentrated on corner portions of the electrode assembly receiving portion, in which the electrode assembly is received. As a result, there is a high possibility of cracks being formed at the corner portions of the electrode assembly receiving portion.

In the case in which cracks are formed at the laminate sheet, as described above, an electrolytic solution may leak out of the battery, or external moisture may be introduced into the battery. Leakage of the electrolytic solution may induce ignition due to high-voltage ground fault current, whereby safety of the battery may be reduced.

In connection therewith, Patent Document 1 discloses a crumple prevention portion formed at a sealing block used in the process of manufacturing a pouch-shaped secondary battery. In Patent Document 1, the sealing block, at which the crumple prevention portion is formed, is used to form sealing portions at outer peripheral corner portions of an electrode assembly receiving portion. It is possible to prevent crumples from being formed at the corner portions of the electrode assembly receiving portion by the provision of the sealing portions.

Patent Document 2 discloses a pouch-shaped battery case configured such that, among outer peripheral sealing portions of a concave portion configured to receive an electrode assembly, a non-sealing portion is formed at the outer periphery through which an electrolytic solution is infused and gas is discharged, wherein ends of the outer periphery through which gas is discharged, excluding a central portion thereof, are sealed in advance.

In Patent Document 1 and Patent Document 2, the sealing portions are formed in advance as structures for preventing crumples from being formed at the corner portions or the ends of the outer peripheries in the early stage of manufacture of the battery case. However, it is difficult to prevent the corner portions from being deformed by stress repeatedly concentrated thereon in subsequent degassing and resealing processes.

Therefore, there is a high necessity for technology capable of preventing corner portions of an electrode assembly receiving portion from being deformed or cracked by force continuously applied to the corner portions while a process of manufacturing a pouch-shaped battery cell is performed.

PRIOR ART DOCUMENTS (Patent Document 1) Korean Patent Application Publication No. 2019-0042801 (2019.04.25)
(Patent Document 2) Korean Patent Application Publication No. 2019-0042800 (2019.04.25)

DISCLOSURE

Technical Problem

The present invention has been made in view of the above problems, and it is an object of the present invention to provide a method of manufacturing a pouch-shaped battery cell using a fixing jig capable of preventing deformation of corner portions of an electrode assembly receiving portion and maintaining the initial shape of the corner portions in a process of manufacturing the pouch-shaped battery cell and a pouch-shaped battery cell manufactured using the same.

Technical Solution

In order to accomplish the above object, a method of manufacturing a pouch-shaped battery cell according to the present invention includes (a) forming an electrode assembly receiving portion in a laminate sheet to manufacture a preliminary battery case, (b) placing an electrode assembly in the electrode assembly receiving portion and sealing outer peripheries of the preliminary battery case excluding a first side outer periphery of the preliminary battery case, through which gas is arranged to be discharged, (c) disposing a fixing jig at each corner portion of a first side outer periphery of the electrode assembly receiving portion, (d) performing an activation process and a degassing process, (e) resealing the first side outer periphery of the electrode assembly receiving portion, and (f) removing an end of the preliminary battery case, wherein step (d) to step (f) are performed when the corner portions are in tight contact with the inner surface of the fixing jig.

The corner portions may be at a location at which the bottom surface of the electrode assembly receiving portion and two adjacent side surfaces of the electrode assembly receiving portion are joined to each other, and the fixing jig may have a structure configured to wrap the corner portion.

The fixing jig may extend to a resealing prearrangement portion of step (e) so as to wrap the resealing prearrangement portion.

In a concrete example, an adhesive material may be added to the inner surface of the fixing jig such that the corner portion is attached to the inner surface of the fixing jig.

In addition, the adhesive material may be added to the fixing jig by applying an adhesive to the fixing jig, attaching an adhesive film to the fixing jig, or spraying an adhesive material onto the fixing jig.

In another concrete example, the fixing jig may include a suction portion configured to apply a suction force to the corner portion.

Specifically, the suction portion may include a suction pad.

Alternatively, the suction portion may include a suction device.

In addition, another fixing jig may be disposed at each end corner portion of a third side outer periphery of the electrode assembly receiving portion, which is opposite the first side outer periphery.

Alternatively, the fixing jig may be disposed along an entirety of the first side outer periphery of the electrode assembly receiving portion.

The method may further include a process of temporarily sealing the first side outer periphery of the preliminary battery case before the activation process of step (d) is performed.

The present invention provides a pouch-shaped battery cell manufactured using the method of manufacturing the pouch-shaped battery cell and a battery module including the pouch-shaped battery cell.

DESCRIPTION OF DRAWINGS

FIGS. 1(a)-1(f) show a process of manufacturing a pouch-shaped battery cell according to the present invention.

FIG. 2 is a perspective view of a preliminary battery case to which a fixing jig according to a first embodiment is added.

FIG. 3 is a perspective view of a preliminary battery case to which a fixing jig according to a second embodiment is added.

FIGS. 4(a) and 4(b) are perspective views of a preliminary battery case to which a fixing jig according to a third embodiment and a fourth embodiment are respectively added.

FIG. 5 is a plan view of FIG. 4(b).

FIG. 6 is a partial sectional view of FIG. 4(b).

FIGS. 7(a)-7(c) are perspective views of a fixing jig according to each of a fifth embodiment and a sixth embodiment.

FIG. 8 is a perspective view of a preliminary battery case to which a fixing jig according to a seventh embodiment is added.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

A description to embody elements through limitation or addition may be applied to all inventions, unless particularly restricted, and does not limit a specific invention.

Hereinafter, embodiments of the present invention will be described in detail with reference to the accompanying drawings.

FIGS. 1(a)-1(f) show a process of manufacturing a pouch-shaped battery cell according to the present invention.

In order to manufacture a pouch-shaped battery cell according to the present invention, first, a laminate sheet is placed on a die (not shown) and pressed using a punch 10 to form an electrode assembly receiving portion 110. An electrode assembly 105 is then placed in the electrode assembly receiving portion 110, and a second side outer periphery 102, a third side outer periphery 103, and a fourth side outer periphery 104 of a preliminary battery case 100, excluding a first side outer periphery 101 of the preliminary battery case through which gas is discharged, are sealed.

Fixing jigs 120 are disposed at opposite end corner portions 112 of a first side outer periphery 111 of the electrode assembly receiving portion 110, the first side outer periphery 101 of the preliminary battery case 100 is temporarily sealed, and an activation process and a degassing process are performed.

Subsequently, the first side outer periphery 111 of the electrode assembly receiving portion 110 is resealed, and the end outside of the first side outer periphery 111 is removed to manufacture a pouch-shaped battery cell.

After the pouch-shaped battery cell is completed, as described above, the fixing jigs 120 are removed from the opposite end corner portions of the first side outer periphery 111 of the electrode assembly receiving portion.

Each of the corner portions is a portion at which the bottom surface of the electrode assembly receiving portion and two adjacent side surfaces of the electrode assembly receiving portion are joined to each other. The corner portion mentioned in this specification refers to the same portion as the above mentioned portion.

Each of the fixing jigs has a structure configured to wrap a corresponding one of the corner portions. The outer surface of the corner portion at which the fixing jig is disposed may be maintained in tight contact with the inner surface of the fixing jig.

FIG. 2 is a perspective view of a preliminary battery case to which a fixing jig according to a first embodiment is added.

Referring to FIG. 2, fixing jigs 120 are disposed at opposite end corner portions 112 of a first side outer periphery 111 of an electrode assembly receiving portion 110.

The inner surface of each of the fixing jigs 120 is formed so as to have a size and shape corresponding respectively to the size and shape of a corresponding one of the corner portions 112. The inner surface of the fixing jig 120 and the outer surface of the corner portion 112 are completely brought into tight contact with each other.

Even when an external force is applied to the preliminary battery case which results in the preliminary battery case being contracted or twisted in a process of manufacturing a pouch-shaped battery cell, the corner portion is maintained attached to the inner surface of the fixing jig and in tight contact therewith. Consequently, it is possible to prevent the corner portion from being crumpled or cracked.

FIG. 3 is a perspective view of a preliminary battery case to which a fixing jig according to a second embodiment is added.

Referring to FIG. 3, the preliminary battery case 200 includes a first case 200a and a second case 200b, outer peripheries of which are sealed by thermal fusion, and each of the first case 200a and the second case 200b has an electrode assembly receiving portion 210 formed therein.

Also, in a degassing process, which is included in a process of manufacturing a pouch-shaped battery cell, a method of decompressing the preliminary battery case into a vacuum state may be used. At this time, the preliminary battery case may be deformed while being contracted. Such deformation may occur most greatly at a first side outer periphery 211 of the electrode assembly receiving portion, which is oriented in a direction in which gas is discharged. However, the other outer peripheries are also deformed although generally to a lesser degree.

In particular, a third side outer periphery 203 may be deformed more than a second side outer periphery 202 and a fourth side outer periphery 204, since the third side outer periphery is an outer periphery in a major-axis direction of an electrode assembly.

Therefore, FIG. 3 shows the state in which fixing jigs are further disposed at opposite end corner portions 212 of the third side outer periphery 203 of the electrode assembly receiving portion, which is opposite the first side outer periphery 211 of the electrode assembly receiving portion, i.e. the fixing jigs 220 are attached to all corner portions of the bottom surface of the electrode assembly receiving portion. In the case in which the fixing jigs 220 are attached to all of the corner portions 212, as described above, it is possible to prevent deformation of the second side outer periphery to the fourth side outer periphery as well as the first side outer periphery.

The fixing jig 220 shown in FIG. 3 is different from the fixing jig 120 of FIG. 2 in that the planar shape of the portion of the fixing jig that is added to the bottom surface of the electrode assembly receiving portion is not a quadrangular shape but is a "┐" shape.

In addition, the fixing jig 220 further includes an extension portion 222 not only configured to wrap the corner portion 212 but to also extend to a resealing prearrangement portion 214, whereby the fixing jig is formed so as to have a size and shape corresponding respectively to the sizes and shapes of the corner portion 212 and the resealing prearrangement portion 214 extending from the corner portion. Thus, when the fixing jig 220 is used, it is possible to additionally prevent deformation of a connection portion between a side wall 215 of the electrode assembly receiving portion and the resealing prearrangement portion 214.

FIGS. 4(a) and 4(b) are perspective views of a preliminary battery case to which a fixing jig according to each of a third embodiment and a fourth embodiment are respectively added.

Referring to FIG. 4(a), the fixing jig 320 is configured such that the portion of the fixing jig oriented in an x-axis direction, which is a major-axis direction of an electrode assembly receiving portion, is longer than the portion of the fixing jig oriented in a y-axis direction, which is a minor-axis direction of the electrode assembly receiving portion, compared to the fixing jig 220 of FIG. 3.

In consideration of the fact that the major-axis direction outer periphery of the electrode assembly receiving portion is deformed more than the minor-axis direction outer periphery of the electrode assembly receiving portion, the length of the fixing jig attached to the portion of the preliminary battery case that is further deformed is increased, whereby it is possible to improve the effect of preventing deformation of the preliminary battery case.

The fixing jig 420 shown in FIG. 4(b) is configured such that the planar shape of the portion of the fixing jig that wraps the bottom surface of an electrode assembly receiving portion is triangular in shape. In consideration of the fact that deformation of a corner portion of the electrode assembly receiving portion generally occurs at a side wall of the electrode assembly receiving portion, it is possible to achieve a desired effect even when a structure like the fixing jig 420 is used.

Neither of the fixing jigs 320 and 420 shown in FIGS. 4(a) and 4(b) include an extension portion extending to an outer peripheral sealing portion of the electrode assembly receiving portion. Of course, an extension portion may be included, unlike what is shown.

FIG. 5 is a plan view of FIG. 4(b), and FIG. 6 is a partial sectional view of FIG. 4(b).

Referring to FIGS. 5 and 6, the preliminary battery case 400 is configured such that gas is discharged in a direction indicated by the arrows and the fixing jigs 420 are disposed at opposite end corner portions of a first side outer periphery 411 of the electrode assembly receiving portion and oriented in the direction in which the gas is discharged.

Since an adhesive material 421 is added to the inner surface of the fixing jig 420, the corner portion may be stably fixed to the inner surface of the fixing jig 420 in tight contact therewith when the corner portion is flat.

A method of adding the adhesive material to the inner surface of the fixing jig is not particularly restricted. For example, an adhesive may be applied to the inner surface of the fixing jig, an adhesive film may be attached to the inner surface of the fixing jig, or an adhesive material may be sprayed onto the fixing jig.

FIGS. 7(a)-7(c) are perspective views of a fixing jig according to each of a fifth embodiment and a sixth embodiment.

FIG. 7(a) shows a fixing jig 520 having suction pads 521 attached to the inner surface thereof, FIG. 7(b) shows a fixing jig 620 having suction holes 621 formed therein, and FIG. 7(c) shows the fixing jig 620 when viewed from an outside.

When the fixing jig 520 is attached to the outer surface of the corner portion, the fixing jig may apply a suction force to the outer surface of the corner portion without a separate adhesive material, whereby the corner portion may be maintained attached to the inside of the fixing jig.

A suction device 622 is provided on the outside of the fixing jig 620. When the suction device 622 is operated in the state in which the fixing jig 620 is attached to the outer surface of the corner portion, air is suctioned through the suction holes 621, whereby the outer surface of the corner portion may be maintained attached to the inner surface of the fixing jig. When the operation of the suction device 622 is stopped after a pouch-shaped battery cell is completed, force suctioning the corner portion is released, whereby it is possible to remove the fixing jig from the corner portion.

FIG. 8 is a perspective view of a preliminary battery case to which a fixing jig according to a seventh embodiment is added.

Referring to FIG. 8, the fixing jig 720 is formed so as to extend along an entire first side outer periphery 711 of an electrode assembly receiving portion 710 including opposite end corner portions of the first side outer periphery 711 of the electrode assembly receiving portion.

Consequently, it is possible to improve the effect of preventing deformation of the first side outer periphery, which is greatly deformed in a process of manufacturing a pouch-shaped battery cell.

The fixing jig 720 shown in FIG. 8 includes an extension portion 722 extending to a sealing prearrangement portion so as to wrap the corner portions. Of course, however, the fixing jig may include no extending portion.

The method of manufacturing the pouch-shaped battery cell according to the present invention includes a process of removing the fixing jig from the battery case after step (f) (i.e., removing an end of the preliminary battery case).

In the case in which an adhesive material is attached to the inner surface of the fixing jig, it is preferable that the adhesive material be removed from the outer surface of the battery case together with the fixing jig.

Meanwhile, in the case in which suction pads are attached to the inner surface of the fixing jig or in the case in which a suction device is added to the outside of the fixing jig, it is possible to remove the fixing jig while no adhesive material remains on the outer surface of the pouch-shaped battery cell.

In the method of manufacturing the pouch-shaped battery cell according to the present invention and the pouch-shaped battery cell manufactured using the same, as described above, it is possible to prevent cracks from being formed at the corner portion of the electrode assembly receiving portion during the manufacturing process, whereby it is possible to reduce a battery cell defect rate and at the same time reduce if not eliminate the risk of ignition due to infusion of an electrolytic solution.

Those skilled in the art to which the present invention pertains will appreciate that various applications and modifications are possible within the category of the present invention based on the above description.

DESCRIPTION OF REFERENCE SYMBOLS

10: Punch
100, 200, 400: Preliminary battery cases
101: First side outer periphery of preliminary battery case
102, 202: Second side outer peripheries
103, 203: Third side outer peripheries
104, 204: Fourth side outer peripheries
105: Electrode assembly
110, 210, 710: Electrode assembly receiving portions
111, 211, 411, 711: First side outer peripheries of electrode assembly receiving portions
112, 212: Corner portions
120, 220, 320, 420, 520, 620, 720: Fixing jigs
200a: First case
200b: Second case
214: Resealing prearrangement portion
215: Side wall of electrode assembly receiving portion
222, 722: Extension portions
421: Adhesive material
521: Suction pads
621: Suction holes
622: Suction device

INDUSTRIAL APPLICABILITY

As is apparent from the above description, in the present invention, a pouch-shaped battery cell is manufactured in the state in which a corner portion of an electrode assembly receiving portion is in tight contact with the inner surface of a fixing jig. Consequently, the shape of the corner portion brought into tight contact with the fixing jig may be maintained in a process of infusing an electrolytic solution, a process of discharging gas, a process of resealing an outer periphery of a preliminary battery case, and a process of removing an end of the outer periphery of a preliminary battery case.

In addition, an adhesive material may be added to the inner surface of the fixing jig, whereby the outer surface of the corner portion may be maintained in tight contact with the inner surface of the fixing jig.

In addition, suction pads may be added to the inner surface of the fixing jig or a suction device may be added to the fixing jig in order to apply a suction force to the corner portion. Thus, even when the preliminary battery case is contracted due to vacuum decompression, the corner portion is maintained in tight contact with the inner surface of the fixing jig.

Since the shape of the corner portion is supported by the fixing jig such that the shape of the preliminary battery case when the electrode assembly receiving portion is formed in the preliminary battery case is maintained, as described above, it is possible to prevent the preliminary battery case from being crumpled or cracked in a process of manufacturing the pouch-shaped battery cell.

Consequently, it is possible to reduce a pouch-shaped battery cell defect rate and to reduce a danger of ignition due to ground fault current, which may be induced by leakage of the electrolytic solution.

The invention claimed is:

1. A method of manufacturing a pouch-shaped battery cell, the method sequentially comprising:
   (a) forming an electrode assembly receiving portion in a laminate sheet to manufacture a preliminary battery case, the electrode assembly receiving portion defining corner portions extending from a first side outer periphery of the electrode assembly receiving portion to a bottom surface of the electrode receiving portion, the corner portions having a shape;
   (b) placing an electrode assembly in the electrode assembly receiving portion and sealing outer peripheries of the preliminary battery case excluding the first side outer periphery of the preliminary battery case, through which gas is arranged to be discharged;
   (c) disposing a fixing jig at each of the corner portions of the first side outer periphery of the electrode assembly receiving portion;
   (d) performing an activation process and a degassing process, the degassing process being performed using a degassing apparatus;
   (e) sealing the first side outer periphery of the electrode assembly receiving portion;
   (f) removing an end of the preliminary battery case;

(g) removing the fixing jig,
wherein
step (d) to step (f) are performed when each of the corner portions is attached to an inner surface of the fixing jig to prevent the corner portions from being contracted such that the shape of the corner portions is substantially maintained, and
wherein the fixing jig is separate and distinct from the degassing apparatus.

2. The method according to claim 1, wherein
the corner portions are provided at a location at which the bottom surface of the electrode assembly receiving portion and two adjacent side surfaces of the electrode assembly receiving portion are joined to each other, and
the fixing jig has a structure configured to wrap the corner portion.

3. The method according to claim 2, wherein the fixing jig extends to a sealing prearrangement portion of step (e) so as to wrap the sealing prearrangement portion.

4. The method according to claim 1, wherein an adhesive material is added to the inner surface of the fixing jig such that each of the corner portions is attached to the inner surface of the fixing jig.

5. The method according to claim 4, wherein the adhesive material is added to the fixing jig by applying the adhesive material to the fixing jig, attaching the adhesive material as a film to the fixing jig, or spraying the adhesive material onto the fixing jig.

6. The method according to claim 1, wherein the fixing jig comprises a suction portion configured to apply a suction force to each of the corner portions.

7. The method according to claim 6, wherein the suction portion includes a suction pad.

8. The method according to claim 6, wherein the suction portion includes a suction device.

9. The method according to claim 1, further comprising disposing another fixing jig at each corner portion of a third side outer periphery of the electrode assembly receiving portion, the third side outer periphery being opposite the first side outer periphery.

10. The method according to claim 1, wherein the fixing jig is disposed along an entirety of the first side outer periphery of the electrode assembly receiving portion.

11. The method according to claim 1, further comprising a process of temporarily sealing the first side outer periphery of the preliminary battery case before the activation process of step (d) is performed.

12. A pouch-shaped battery cell manufactured using the method according to claim 1.

13. A battery module comprising the pouch-shaped battery cell according to claim 12.

* * * * *